United States Patent [19]

Werth et al.

[11] 4,216,461

[45] Aug. 5, 1980

[54] CODE CONTROLLED MICROCONTROLLER READOUT FROM COIN OPERATED MACHINE

[76] Inventors: Robert L. Werth, 2053 W. Romneya Dr., Anaheim, Calif. 92801; Timothy L. Brehm, 27 Golden Star, Irvine, Calif. 92714

[21] Appl. No.: 830,758

[22] Filed: Sep. 6, 1977

[51] Int. Cl.[2] ........................ G08B 25/00; H04Q 9/00; G06K 5/02; G06F 7/00

[52] U.S. Cl. ........................... 340/149 R; 235/92 CN; 273/143 R; 340/150; 340/162; 364/479; 194/1 N

[58] Field of Search ............... 340/149 R, 147 A, 152, 340/151, 150, 162; 364/403, 406, 479; 235/92 AC, 92 CN, 92 ST, 92 RD; 273/138 A, 139, 143; 194/1 N

[56] References Cited

U.S. PATENT DOCUMENTS

| | | | |
|---|---|---|---|
| 3,786,421 | 1/1974 | Wostl et al. | 340/147 A |
| 3,894,220 | 7/1975 | Levasseur | 364/479 |
| 3,931,497 | 1/1976 | Gentile et al. | 340/149 A |
| 4,072,930 | 2/1978 | Lucero et al. | 340/152 T |
| 4,075,463 | 2/1978 | Eguizabal | 364/479 |
| 4,086,434 | 4/1978 | Bocchi | 340/151 |

OTHER PUBLICATIONS

"Computerized Automatic Pumping System", L. L. Pelletier *IBM Technical Disclosure Bulletin*, vol. 14, No. 10 May 1972, pp. 3729–3731.

"Inventory Unit is Tiny Data Terminal" *Electronics*, vol. 49 No. 19, pp. 16E, 18E, Sep. 16, 1976 (Reproduced by *Patent Associated Literature*).

*Primary Examiner*—Donald J. Yusko

*Attorney, Agent, or Firm*—Willie Krawitz

[57] ABSTRACT

A coin counter attached to a vending machine and a microprocessor controlled portable collection unit (PCU) are provided for monitoring vending machine operations. This enables transactions of the machine to be calculated, stored and recorded. The coin counter forms part of a microelectronic circuit (e.g. a MOS type) and is attached or mounted as a package to the vending machine. The counter is primarily designed to count net coin intake but can be programmed to provide other information such as coin collection times, vending machine number, code validations, etc.

The PCU has a keyboard to input information to the counter and access information therefrom; the PCU calculates the coin count value and displays this value and the other information on an LED, printer, etc., upon input of a suitable access code.

The PCU may be employed for servicing a number of vending machines to better pinpoint responsibility for collection deficiencies, determining location and machine effectiveness, peak load times, and so forth. The information so obtained can be maintained secret within the PCU itself and can be accessed only upon the input of the correct code.

18 Claims, 6 Drawing Figures

CODE CONTROLLED MICROCONTROLLER READOUT FROM COIN OPERATED MACHINE

BACKGROUND OF THE INVENTION

This invention relates to a new and improved system for coin counting, totalling and reading-out information arising from coin transactions in vending machines and the like. More specifically, this invention concerns the use of single chip microelectronic circuits for counting the net coin intake of a vending machine, storing the count and reading it out to a microprocessor controlled portable collection unit (PCU). The coin counter may be wired, permanently attached or integrated with the vending machine and is considerably less costly than the vending machine itself. The PCU is used to calculate a money total from the coin count and, if desired, display or output certain other operations associated with the vending machine. The PCU is employed to service a large number of vending machines, and although considerably more expensive than the counter, since its use is spread over a large number of vending machines, its unit cost is relatively low.

Vending machines in the broad sense provide a fixed service for a specific price and include such varied devices as games, laundromat equipment, food dispensers, music players, cigarette vending machines, photographic equipment, television sets and other coin operated devices.

The vending machines must be serviced for coin collections, change replenishment, service replenishment such as food, soap, photographic film, etc. Also, in the case of vending machines such as games, music players, etc., the owner would like to have information on whether the income from the vending machine is adequate for its location and also optimum servicing times. When a machine is serviced, access must be obtained to the interior of the machine and this involves the honesty of the coin collector, part owner, lessee, proprietor, etc., where the vending machine is located. If these people are dishonest, even a small amount of "skimming" can, over a period of time, amount to a substantial income loss.

Devices are presently on the market which total coin counts and obtain a dollar value therefrom; however, they are not tamper resistant and can be physically jammed. Even assuming the accuracy of a coin counter, an access key to a vending machine can be duplicated and this poses additional problems.

Hence, a check on income, servicing requirements, performance, etc., is desireable from many standpoints. Furthermore, as between competitive devices and their locations, secrecy is important since the most suitable machine in an optimum location can spell the difference between a successful or a defunct business. Also, customer preference for game machines can change quickly and this may necessitate a machine being removed to a new location or being taken completely off the market.

Consequently, a need exists for a tamper-resistant counting device which can be accessed without opening the coin box of the vending machine and which provides information on total coin intake, servicing requirements, prior service history, useage times, power outages, tamper attempts, etc. Monitoring of these items not only can provide a coin count, but also can pinpoint the presence of particular employees when the vending machine is serviced, tampered with, etc. This knowledge in itself represents a deterrent to interfering with normal operations of the vending machine. In any event, if a shortage exists, use of a counter which is accurate and tamper resistant permits the owner to establish the extent of his losses which serve as a legitimate basis for a tax loss claim.

THE INVENTION

According to the invention, a tamper resistant system for coin counting and totalling net intake of vending machines is provided comprising a sensing and counting device employing a microelectronic circuit chip having a plurality of memory registers. The counting device is attached or incorporated with the vending machine and is adapted to sense and count net coin intake (after coin changing) and store the net count and other related operations in a plurality of memory registers in the microelectronic circuits. These related operations may include an access code which is unique to the machine (and hence the owner), coin collection dates and times, power interruptions, vending load times, tampering, etc.

A PCU is provided having an input keyboard to access the memories upon input of a valid access code. The output from the memories of the coin counter is added in the PCU to obtain a money value which may be read out from the PCU on a display such as an LED, LCD, incandescent, etc., or onto a printer, casette, punched card, teletype, etc; the other related operations are similarly read out. The PCU also may be adapted to store the read-outs and display them only upon receipt of a second access code. This permits the owner, lessee, etc., to enjoy total secrecy from the person (akin to the meter reader) who actually obtains the information from the coin counter. This arrangement ensures a double check on the secrecy of the contents in the coin counter, if desired, since a first access code is required to read-out the information from the coin counter and a second access code is needed to read-out the information from the PCU. The coin counter should contain the fewest number of operating functions on a cost basis, and hence, a register for validating the codes is contained preferably within the PCU.

DESCRIPTION OF THE PREFERRED EMBODIMENT

Figure 1:
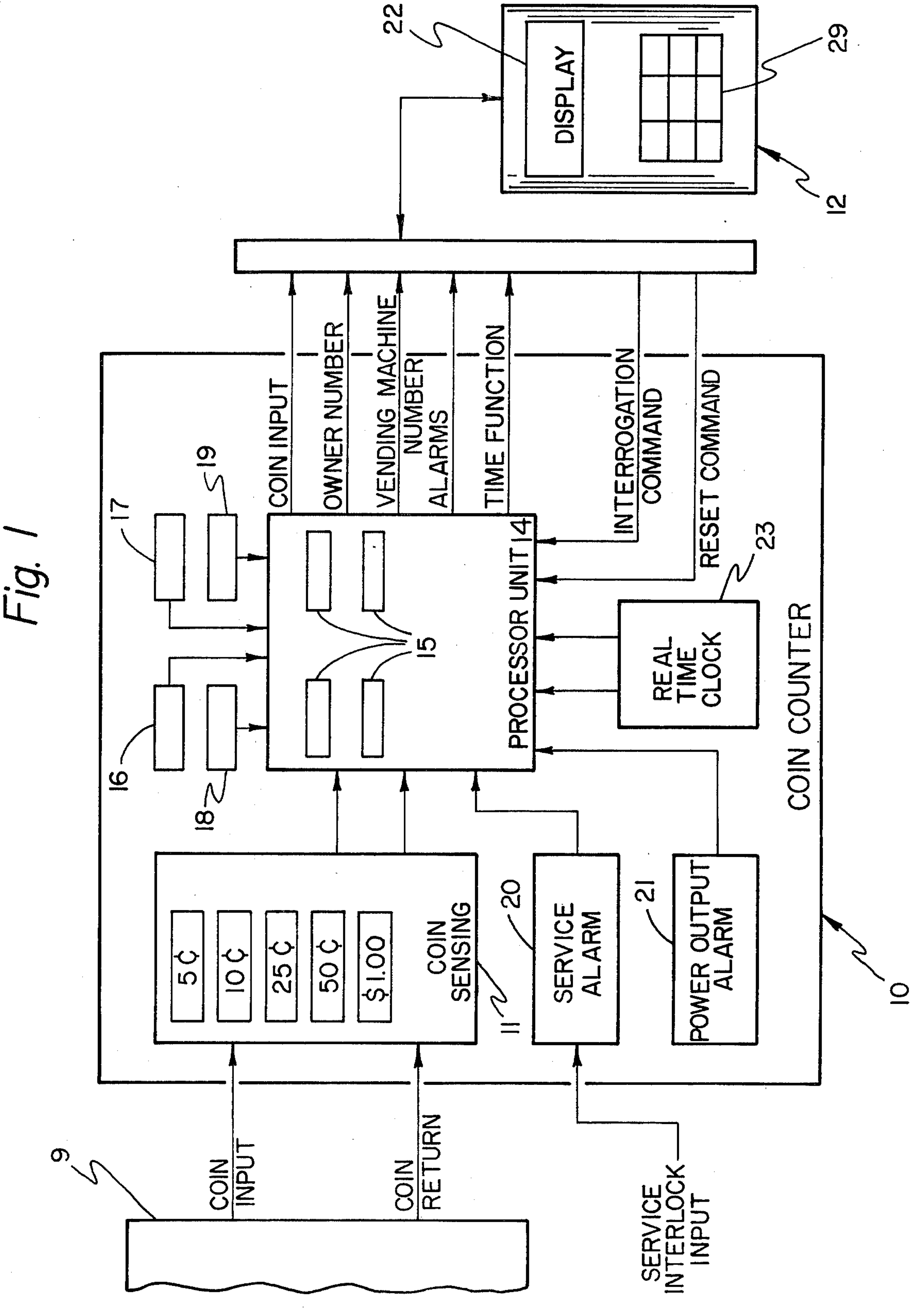
FIG. 1 is a block diagram showing the overall view of the counter and PCU arrangement of this invention.

The overall system is shown in FIG. 1 and includes a vending machine 9 and a coin counter 10 including the usual coin sensing circuits 11. A portable PCU 12 is provided to interrogate the counter 10 and obtain information stored therein concerning transactions which have occurred in the vending machine. The coin counter 10 is adapted to sense various coin denominations which generally range from 5¢ through $1.00 in any combination; coins returned from the machine are also sensed. Signals from the coin sensing step are then converted to digit pulses and entered into a processor unit 14 in the counter to arrive at a coin input for a given transaction. The coin input is stored as a coin count in a plurality of microelectronic circuit registers 15 or in a RAM. The registers may be physically detachable for subsequent processing at a remote location by the PCU. Alternatively, in the preferred form of the invention, the storage or registers may be internal, i.e., contained with in the circuitry of the chip. In another embodiment, say, where only a numerical count is desired, the storage or registers may be an LED, LCD, incandescent display, etc. The storage or registers (e.g. on a CMOS chip) are powered by an A.C. source or a D.C. battery which enables them to store the information until released or accessed by the PCU.

In addition to the usual sensing and counting circuitry, the counter 10 may be provided with a hard-wired memory 16, 17 containing an owner access code and machine code respectively; alternatively, microelectronic circuit registers 18 and 19 may be employed to contain the access code and the machine code respectively. The latter has the advantage of permitting a code change if the vending machine is relocated, or if the ownership becomes changed, etc.

An interlock 20 or other sensing device may be provided to indicate service times of the vending machine; similarly, a power outage sense 21 may be employed to indicate, via a signal or read-out that battery tampering or battery deterioration has occurred.

The PCU I/O device 12 is provided for the system to input as appropriate access code into the counter and thereby enable release of data or information stored therein. The PCU is adapted for converting the coin count from the counter into a total coin value and either display the results on a read-out 22 or store the value for future use. In the latter case, a second access code may be employed to release the information from the PCU.

In addition to obtaining coin values and code changes, additional information such as coin collection times, service dates, power interruptions and times, etc., can be read out from the counter to the PCU or they may be stored in the PCU for subsequent read-out.

A real time clock 23 is used to provide times and dates of various transactions which are synchronized for read-out at convenient intervals, e.g. every 5 minutes. Hence, transaction activities can be monitored with a reasonable degree of accuracy in terms of time.

Figure 2:
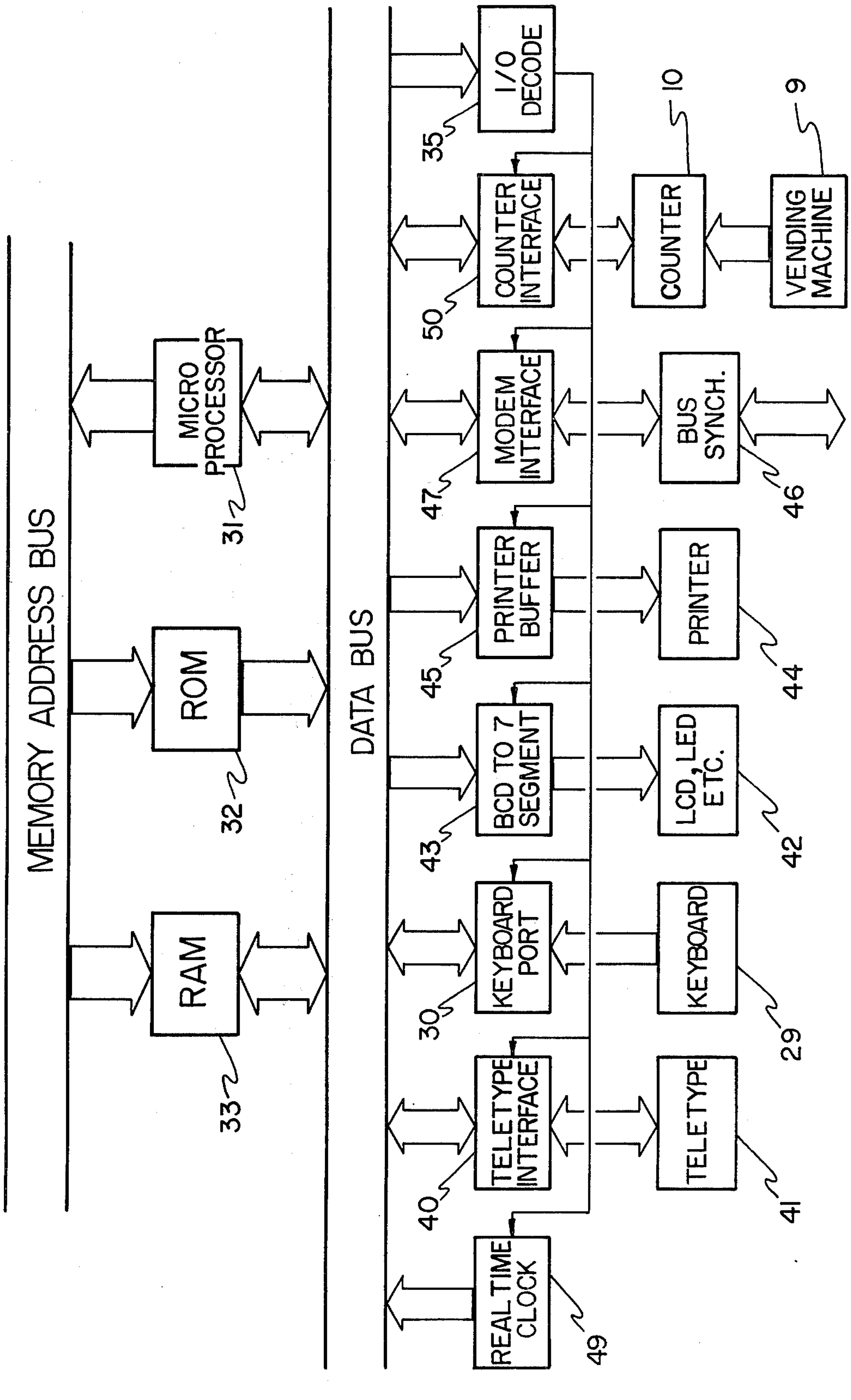
FIG. 2 shows a block diagram of the PCU.

The architecture of the PCU is shown in FIG. 2 and includes a keyboard input 29 for supplying specific data acquisition requests, and codes such as access and change codes to the system. Specific data acquisition requests include obtaining coin totals from the counter and determining their money values, dates and times of use, servicing, etc.

Inputs from the keyboard 29 are fed to a digit converter 30 for converting keyboard contacts to digit pulses. These pulses are fed to a data bus and then to a microprocessor 31 where they are converted to a command. If the command is an add, the microprocessor will access information from a RAM 33 and a ROM 34 to enable the instruction to be carried out. If the instruction is a code validation, the operation may be carried out in a comparison register using, say, a subtraction process. If the subtraction yields a number not equal to zero, the machine number and access code, which has been entered through the keyboard, are obviously not the same and the program will permit no information to be transmitted or received at any I/O port. Preferably, however, a code validation is carried by a program described, infra. If the instruction is a print or read out, data from the microprocessor will be decoded in an I/O decode 35 and sent to a teletype interface 40 for conversion to pulses in, say, a control character register to activate the appropriate numbers and characters for print out by a teletype 41. Similarly, other print out instructions may be sent to an LED, LCD, 42 etc., via a BCD-to-number decode 43, or to a printer 44 via a printer interface 45. A bus synchronizing clock 46 operating via a modem 47, synchronizes movement of pulses through the system and with the read out, if any. The bus system is the UNIBUS variety, but other types may be used. A real time clock 49 may be used to afford a date and time read out along with the other data. A counter interface 50 is employed to input instructions to the counter 10 from the microprocessor 31 through the I/O decode 35.

The PCU 12 may be a CMOS chip sold by RCA as the CDP 1802 and described in their "User Manual for the CDP 1802 COSMAC Microprocessor", (1976) MPM-201A. The processor unit 14 in the counter 10 may employ CMOS chip parts or a processor similar to one manufactured by Western Digital Corporation as their CR 1872 and described in their "CR 1872 User's Manual", June 1977; the latter may employ a "sleep mode" by powering the registers at about 1/50–1/500 of the usual operating frequency when not in active use, with PMOS.

Figure 3A:
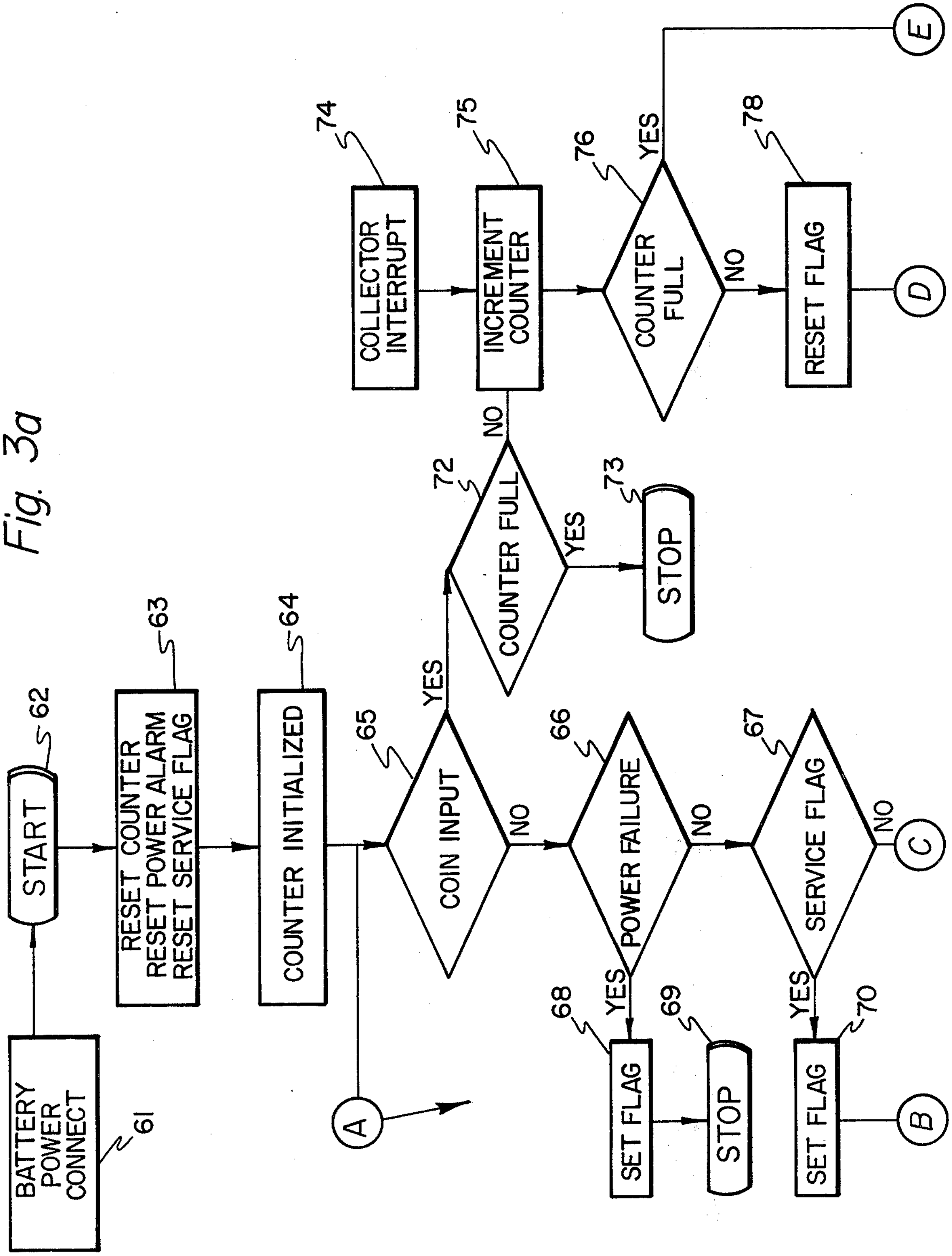
FIGS. 3A, 3B, 4A, 4B show two programs employed for the operation of the counter and PCU.
Figure 3B:
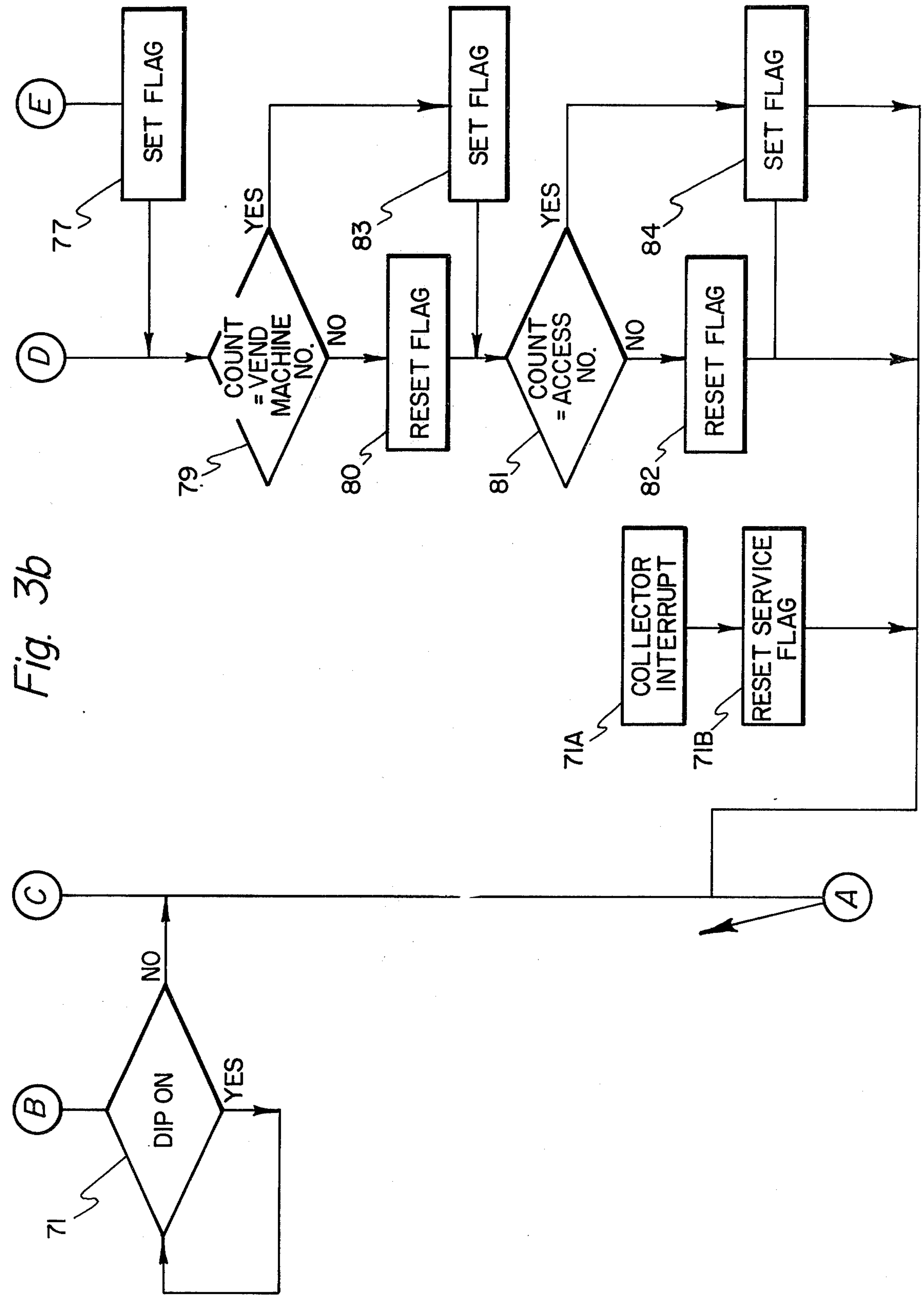

FIG. 3 illustrates a computer program employed for operating the counter. Assuming the battery has been connected 61, the counter will be started 62, and the counter, power alarm and service flags will be all reset 63 followed by counter initialization 64. Proceeding down the main path, if there is no coin input 65, and the power is on 66, and there has been no service for the vending machine, the service flag will indicate "no" and the program will idle through A—A and return to the coin input 65. If a power failure has occurred, a flag will be set 68 and the sensor will stop functioning 69. When power is resumed, the power flag 63 is reset, the counter is initialized 68, and the program will proceed. If a service flag has been set 70, a check is made for a service disable plug 71 (not shown), removal of which will cause the program to idle until service is completed; the program will then return to the main path and back to the coin input 65. Upon termination of service to the vending machine, a collector interrupt 71A will reset a service flag 71B and return to the coin input 65.

Assuming a coin input has occurred, a check is made to determine if the counter is full 72, and if so, the counter will be stopped 73 rather then being set to a zero value; consequently, only information on overflow beyond the maximum reading will be lost.

To collect data from the counter, an external interrupt 74 is used to forceably increment the counter 75. The collector, given the capacity of the counter, monitors the counter full flag and continually increments the counter by one. When the counter is full 76, a flag is set 77, and the collector counts the number of increments, calculates the number in the counter prior to the incrementing step and stores the number. If the counter is not full, a flag reset occurs and the program reiterates; eventually, the program determines if the count has equalled the vending machine number 79 and then sets a flag 83. A like operation is then performed for the access codes 80, 81, 82 and 84.

Figure 4A:
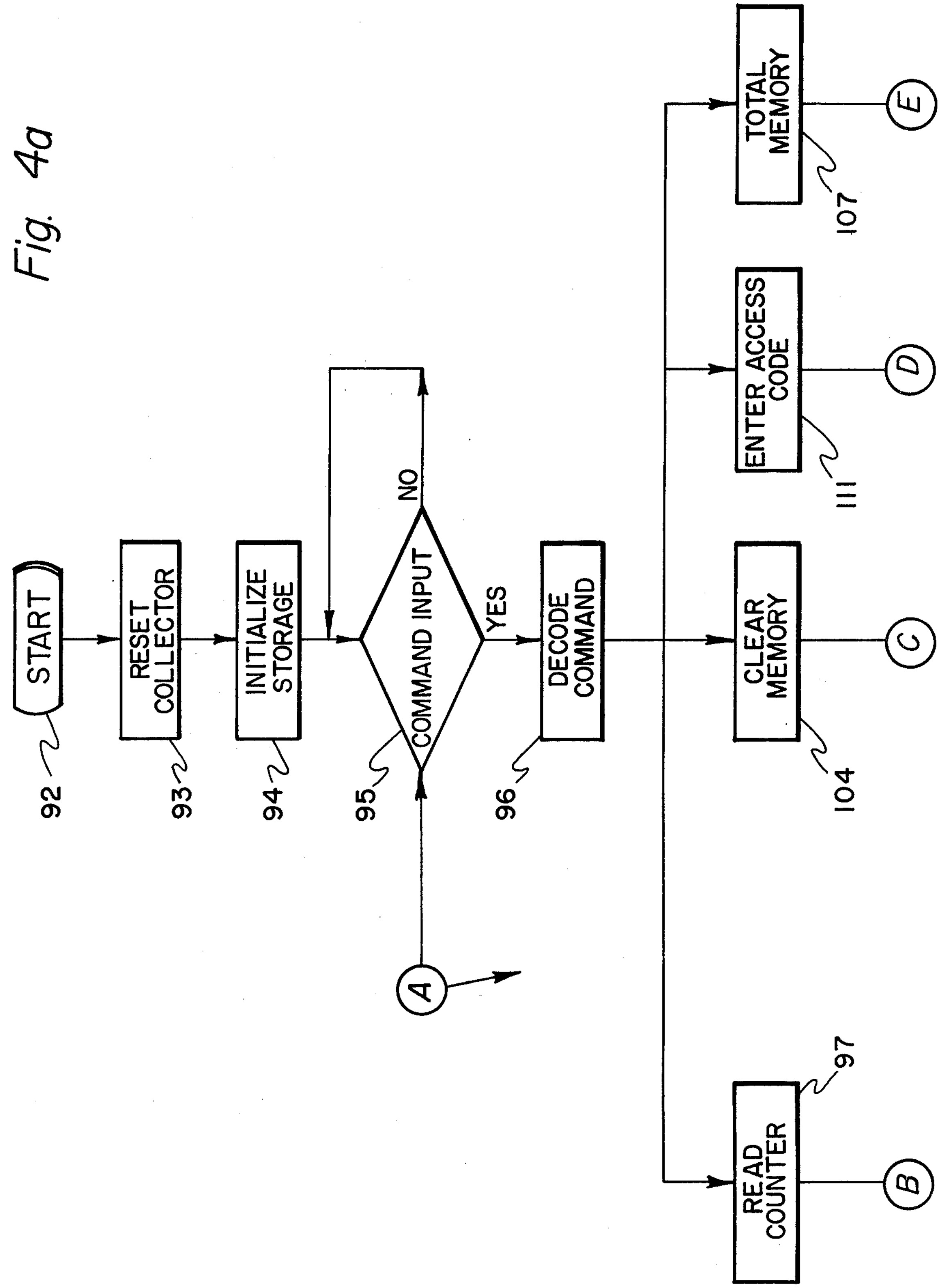
Figure 4B:
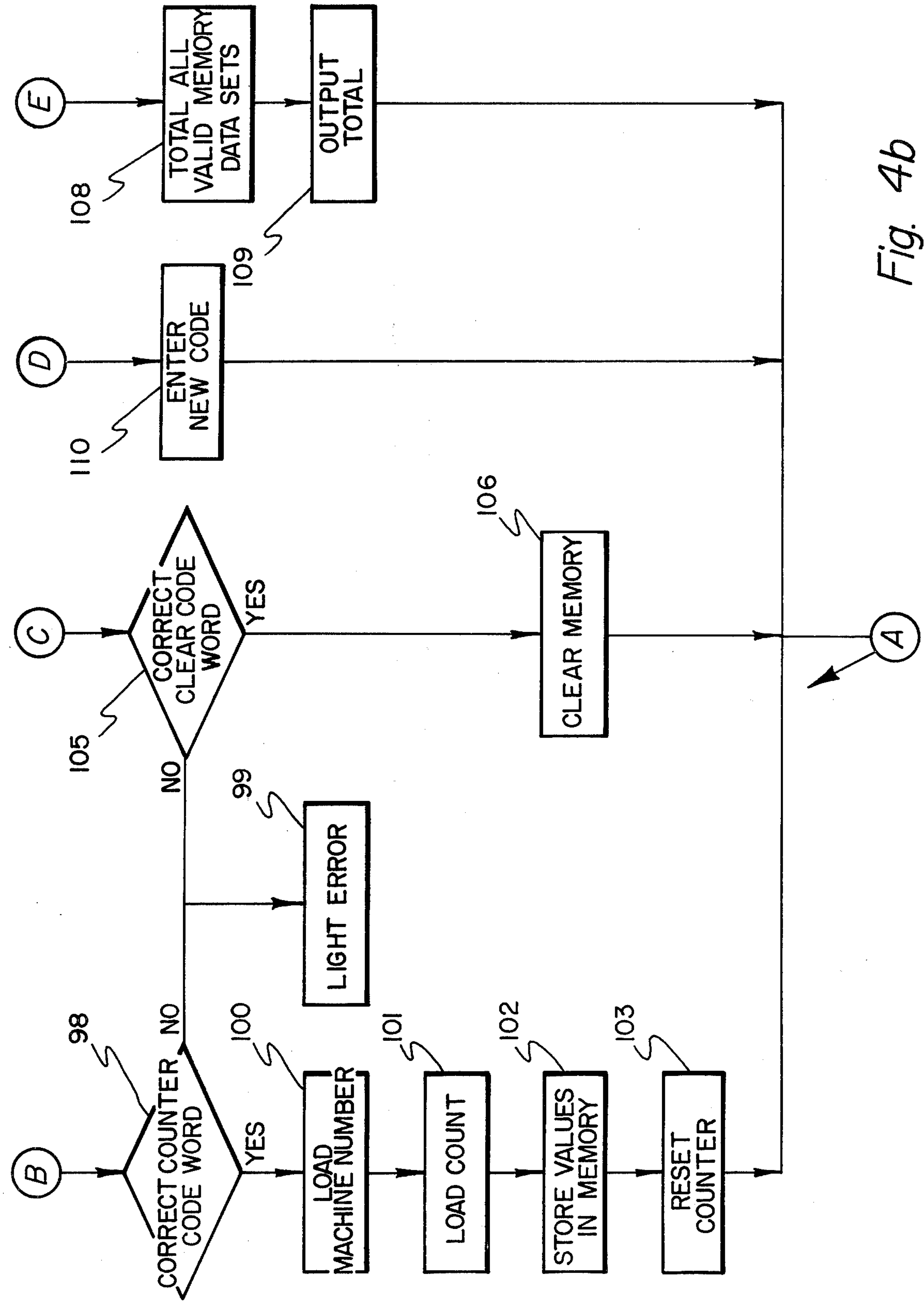

FIG. 4 shows the program for the data collection function of the PCU 12. When the PCU has been plugged in and turned on 92, the registers are reset 93 and the storage initialized 94; this can be set at zero or set from a prior reading. The program then awaits the first command input 95 and the PCU will idle in the first command input loop until it receives an instruction from the keyboard. Upon receipt, an instruction is decoded 96 and will perform a counter read 97, a memory clear 104, a totalling operation 107 or an enter access code 110.

If a read counter command 95 is given, and flags 78, 79 have been set indicating the vending machine and access codes correspond, the flags will be fed to the correct code word 98 step and the program will proceed. If a reset flag 80 or 32 is present in the correct counter code word 98, this indicates either one or both of the machine number or access codes are incorrect and hence a light error 99 will appear; the counters then will initialize 64. Proceeding down the main path from the read counter 97, assuming a correct access code word has been fed from the keyboard, the vending machine number 100 and count, time, or other data 101 are loaded from a particular register in the counter and stored 102 in the PCU. The collector is then reset 103 and the program proceeds to the command input 95 for a further instruction.

If a clear memory mode 104 is entered into, the correct code word 105 is ascertained by the presence or absence of a flag and the memory is cleared 106; this frees the PCU for further data collection.

If a coin total and read out is desired, a total memory routine 107 is connected; all totals 108 are calculated and then displayed 109 by teletype, LED, etc. As mentioned, use of a real time clock permits a periodic time check of transactions and enables a vending machine owner to determine peak useage time and hence service requirements. The time checks also can pinpoint power shortages which can be instigated by employees who desire to interfere with the data collection process of a vending machine.

If desired, the machine code (and hence access code) can be altered 110, 111; this may be necessary if ownership changes hands or if the access code becomes disseminated too widely.

The following are special and operating code functions employing a keyboard of a standard 16 key station type:

SPECIAL FUNCTIONS

- E—enter, PCU acquires input and performs commands or accepts data;
- =—PCU exchanges display from machine number to dollar count value (displays last machine entered);
- CLR—resets program which reinitializes the registers; however, this does not reset the memory if a count is stored therein;
- +—automatically causes the PCU to display the next machine number dollar value;
- ——PCU will back up to display the previously entered machine dollar value.

OPERATING FUNCTIONS

OPERATING FUNCTIONS:

| OPERATION: | FUNCTION: |
|---|---|
| 1. Power off | No battery-unit power always on. |
| 2. Power On | Battery connected-power applied to all circuits. Power on reset is performed when PCU is reset to 'oooo' and clock is started. Program does housekeeping and goes into wait loop and polls inputs. |
| 3. Read Counter Data CMD = $10_x$ | PCU addresses counter and checks for good connection; bad connection results in LED indication. Battery 'bad' indication is also shown, indicating the counter battery is low. The PCU then begins to rachet the counter around and look at the MSB of the counter. When the MSB is active, it indicates that the counter has been advanced half way; the count is then calculated from the MSB point. The vending machine number and the access code are derived in a similar manner. The precise number is tapped off the counter and when a match occurs, the output for each will go active; the counter is then driven to zero. |
| 4. Display Counter CMD = $11_x$ | Accesses the last counter entered or displayed and outputs to LCD for predetermined period. |
| 5. Display Counter CMD = $12_x$ | Displays last machine entered into memory. |
| 6. Display Machine No. CMD = $13_x$ | Searches all active entries for a specified machine number and displays total. |
| 7. Add To Memory Acc. CMD = $14_x$ | Adds last displayed machine count to accumulator registers. |
| 8. Clear Memory Acc. CMD = $15_x$ | Resets contents of memory accumulator. |
| 9. Display Memory Acc. CMD = $16_x$ | Displays contents (total) in memory accumulators. |
| 10. Display Memory ± 1 CMD = $17_x$ | Allows user to sequence through memory and display each total individually both forwards and backwards. |
| 11. Display Total CMD = $18_x$ | PCU totals all valid machine values and displays total amount in dollars and cents. |
| 12. Clear memory CMD = $19_x$ | If the proper access code is entered, the PCU will reset the entire memory. |
| 13. Print Machine No. Total CMD = $20_x$ | This command can be used to print the total from a specific machine. |
| 14. Print Total CMD = $21_x$ | The entire contents of memory is printed sequentially, and then the dollar total is printed. |
| 15. Enter Access Code CMD = $22_x$ | To use a common ROM plus omission of jumper wires, this command will enter the access code in the memory. |
| 16. Enter Time & Date CMD = $23_x$ | Allows user to enter time and date for printing on daily machine totals for documentation purposes. |

*x = hexidecimal

The counter 10 is shown as being adapted to store a coin count which is then read and computed to a money value by a PCU. However, as an alternative, the counter can be located remote from the vending machine, but wired thereto. When provided with, say, an inexpensive LED read-out, the coin totals can be hand calculated to a money total. Using coin sensors located within the machine as is usually the case, and the counter and display located remotely from the vending machine, the counter would be more secure and could be read without a PCU. Readout would be accomplished by simply displaying the register contents in sequence.

We claim:

1. An apparatus for sensing, totalling and displaying transactions in a vending machine comprising:

1. sensor and totalling means including:
   A. means for sensing coin input and output transactions;
   B. means for converting the sensed transactions into digit pulses;
   C. a plurality of microelectronic circuit registers to receive the digit pulses including:
      i. internal totalling registers for counting net coin intake;
      ii. memory registers for storing the net coin count; and,
      iii. output registers for outputting the net coin count from the memory registers; and,
2. A detachable digital portable collection unit for receiving transaction information from the memory registers, the collection unit being adapted to serve a plurality of vending machines, and including:
   A. ROM and RAM memories;
   B. a keyboard input;
   C. an input register; and,
   D. a read-out register;
   the PCU being adapted for access and interrogation of the output registers for data contained in the memory registers, the collection unit being adapted to input data, code and code changes into the sensor and totalling means.

2. The apparatus of claim 1 including memory registers in the sensor and totaller for storing times and dates of: coin collection, coin useage, power interruptions battery deterioration, tampering and servicing and to receive the net coin count information from the output registers, total the net coin count, and readout the information on a read-out register upon activation by the key board input.

3. The apparatus of claim 1 including:
   i. memory registers in the sensor and totaller adapted to store vending machine numbers and corresponding validation codes; and,
   ii. output registers for outputting the transactions from the memory registers upon receipt of a valid input code;
   the portable collection unit including a register for validating a stored code in the memory register and being adapted to receive information from the memory registers only upon the input of a valid code.

4. The apparatus of claim 1 in which the portable collection unit is adapted to reset the memory registers.

5. The apparatus of claim 1 in which the PCU is adapted to store and lock into a memory register all information obtained from the sensor and totaller.

6. The apparatus of claim 3 in which the validation register is included in the sensor and totaller registers.

7. The apparatus of claim 1 including:
   i. memory registers in the sensor and totaller adapted to store validation codes; and,
   ii. output registers for outputting the transactions from the memory registers upon receipt of a valid input code;
   the portable collection unit including a register for validating a stored code in the memory register and being adapted to receive information from the memory registers only upon the input of a valid code, from a keyboard input.

8. The apparatus of claim 1 including a portable collection unit adapted to receive and store information from the memory register upon input of a first code and release the information upon input of a second code.

9. The apparatus of claim 1 in which the portable collection unit contains a microprocessor.

10. The apparatus of claim 1 comprising battery powered MOS logic for the collection unit and counter.

11. The apparatus of claim 1 including memory registers in the sensor and totaller forstoring servicing requirements, prior service history, power outages, battery deterioration, tamper attempts and useage times.

12. An apparatus for sensing and totalling transactions in a vending machine, comprising:
   A. means for sensing coin input and output transactions;
   B. means for converting the sensed transactions into digit signal pulses; and,
   C. a plurality of microelectronic circuit registers to receive the digit pulses, including:
      i. internal totalling registers for counting net coin intake;
      ii. memory registers for storing the net coin intake; and,
      iii. a read-out register for outputting:
         a. the net coin intake from the memory registers, servicing requirements, prior service history, power outages, battery deterioration tamper attempts and useage times; and,
         b. times and dates of: coin collecting, coin useage, power interruptions, tampering and servicing;
   the read-out registers being adapted for accessing and interrogation by a detachable, portable collection unit for data contained in the memory registers, the collection unit being adapted for input of data, code and code change, and for servicing a plurality of vending machines, by means of a keyboard input.

13. The apparatus of claim 2 comprising battery powered MOS logic for the collection unit and counter.

14. The apparatus of claim 12, including CMOS and PMOS logic.

15. The apparatus of claim 12, including:
   i. memory registers in the sensor and totaller adapted to store vending machine numbers and corresponding validation codes; and,
   ii. output registers for outputting the transactions from the memory registers upon receipt of a valid input code;
   the portable collection unit including a register for validating a stored code in the memory register and being adapted to receive information from the memory registers only upon the input of a valid code, from a keyboard input.

16. The apparatus of claim 12, including:
   i. memory registers in the sensor and totaller adapted to store validation codes; and,
   ii. output registers for outputting the transactions from the memory registers upon receipt of a valid input code;
   the portable collection unit including a register for validating a stored code in the memory register and being adapted to receive information from the memory registers only upon the input of a valid code, from a keyboard input.

17. The apparatus of claim 12 including a portable collection unit adapted to receive and store information from the memory register upon input of a first code and release the information upon input of a second code.

18. The apparatus of claim 12 in which the portable collection unit contains a microprocessor.

* * * * *